(12) United States Patent
Riu

(10) Patent No.: US 8,202,183 B2
(45) Date of Patent: Jun. 19, 2012

(54) PULLEY ASSEMBLY

(75) Inventor: Hervé Riu, La Murette (FR)

(73) Assignee: Dayco Europe S.r.l., Chieti (IT)

( * ) Notice: Subject to any disclaimer, the term of this patent is extended or adjusted under 35 U.S.C. 154(b) by 456 days.

(21) Appl. No.: 12/309,069

(22) PCT Filed: Jul. 7, 2006

(86) PCT No.: PCT/IT2006/000519
§ 371 (c)(1),
(2), (4) Date: May 29, 2009

(87) PCT Pub. No.: WO2008/004258
PCT Pub. Date: Jan. 10, 2008

(65) Prior Publication Data
US 2009/0318252 A1     Dec. 24, 2009

(51) Int. Cl.
*F16D 3/00*      (2006.01)
*F16H 55/14*     (2006.01)
*F16H 55/36*     (2006.01)
*F16H 9/00*      (2006.01)
*F16H 59/00*     (2006.01)
*F16H 61/00*     (2006.01)
*F16H 63/00*     (2006.01)

(52) U.S. Cl. ............................................. 474/94; 474/70
(58) Field of Classification Search .................... 474/94, 474/70; 192/55.5
See application file for complete search history.

(56) References Cited

U.S. PATENT DOCUMENTS

| | | | | |
|---|---|---|---|---|
| 3,304,924 A * | 2/1967 | Dolza | ......................... | 123/90.31 |
| 3,618,730 A * | 11/1971 | Mould, III | ................... | 192/56.2 |
| 3,750,785 A * | 8/1973 | Smith et al. | ................. | 192/81 C |
| 4,103,516 A * | 8/1978 | Marcin | ..................... | 198/781.02 |
| 4,433,765 A * | 2/1984 | Rude et al. | .................... | 192/41 S |
| 4,725,260 A * | 2/1988 | Komorowski et al. | ........ | 474/135 |
| 4,813,525 A * | 3/1989 | Rangert et al. | ............... | 192/41 S |
| 5,139,463 A * | 8/1992 | Bytzek et al. | ................... | 474/69 |
| 5,156,573 A * | 10/1992 | Bytzek et al. | ................... | 474/74 |
| 6,044,943 A * | 4/2000 | Bytzek et al. | ............... | 192/41 R |
| 6,083,130 A * | 7/2000 | Mevissen et al. | ................ | 474/70 |
| 6,394,247 B1 * | 5/2002 | Monahan et al. | ............ | 192/41 S |
| 6,761,656 B2 * | 7/2004 | King et al. | ....................... | 474/74 |
| 7,150,679 B2 * | 12/2006 | Pape et al. | ....................... | 464/17 |
| 7,153,227 B2 * | 12/2006 | Dell et al. | ....................... | 474/70 |
| 7,207,910 B2 * | 4/2007 | Dell et al. | ....................... | 474/74 |
| 7,399,245 B2 * | 7/2008 | Spintzyk | ......................... | 474/94 |
| 7,591,357 B2 * | 9/2009 | Antchak et al. | .............. | 192/55.5 |
| 7,618,337 B2 * | 11/2009 | Jansen et al. | ..................... | 474/74 |
| 7,712,592 B2 * | 5/2010 | Jansen et al. | ................. | 192/41 S |
| 7,766,774 B2 * | 8/2010 | Antchak et al. | ................. | 474/74 |
| 7,874,950 B2 * | 1/2011 | Lehtovaara et al. | .......... | 474/135 |

(Continued)

*Primary Examiner* — Michael Mansen
*Assistant Examiner* — Henry Liu
(74) *Attorney, Agent, or Firm* — Davidson Berquist Jackson & Gowdey, LLP

(57) ABSTRACT

A pulley assembly for flexible motor vehicle transmission, comprising a supporting member rotatable about an axis, a pulley adapted to cooperate with a belt and connected to the supporting member to be rotatable about said axis with respect to the supporting member, a spiral spring interposed between the supporting element and the pulley and comprising a sliding portion elastically loaded in radial direction against a sliding wall carried by one of either the supporting members or the pulley for coupling by a tangential force transmission the hub to the supporting member. In particular, the sliding portion defines a first contact zone and a second contact zone in which is concentrated the contact pressure exchanged between the sliding portion and the sliding wall, the first and second contact zone being reciprocally and angularly distanced.

23 Claims, 4 Drawing Sheets

U.S. PATENT DOCUMENTS

| | | | |
|---|---|---|---|
| 7,878,315 B2 * | 2/2011 | Saito et al. | 192/41 S |
| 7,892,124 B2 * | 2/2011 | Hodjat et al. | 474/94 |
| 2004/0014540 A1 * | 1/2004 | Dell et al. | 474/70 |
| 2005/0250607 A1 * | 11/2005 | Jansen et al. | 474/74 |
| 2008/0207364 A1 * | 8/2008 | Schebitz et al. | 474/94 |
| 2008/0312015 A1 * | 12/2008 | Schebitz et al. | 474/94 |
| 2009/0223775 A1 * | 9/2009 | Hodjat et al. | 192/41 S |

* cited by examiner

PULLEY ASSEMBLY

TECHNICAL FIELD

The present invention relates to a pulley assembly, particularly for a drive belt, adapted to connect a plurality of accessory members to a crankshaft of an internal combustion engine.

BACKGROUND ART

Pulley assemblies comprising a hub adapted to be rigidly connected to a crankshaft of an internal combustion engine and a pulley adapted to cooperate with a belt of the accessory drive and rotationally connect to the hub by means of a spiral spring are known.

Such known assemblies also generally comprise an integrated torsional damper, which consists of an annular seismic mass coaxial to the hub and an elastic connection element arranged between the hub and the seismic mass.

In use, the spiral spring is coupled with the rotation of the hub and the pulley and presents a relatively low stiffness so as to allow to filter the torsional vibrations of the crankshaft and avoid such vibrations from being transmitted to the accessory drive.

In the known pulley assemblies, the pulley is connected radially to the hub by means of bushing and comprises a cylindrical wall defining a central cavity for accommodating a portion of the hub and the spiral spring. The spiral spring comprises a first end portion connected rigidly to the hub and a second end portion fitted with radial interference against the cylindrical wall.

During operation, the pulley can advance the hub and the second end portion may slide in relation to the cylindrical wall when a maximum transmissible torque value is exceeded. Such condition occurs during cranking of the engine when there are considerable fluctuations in torque, or during the instants immediately following sudden deceleration when the crankshaft turns at a relatively slow angular speed while the accessory drive proceeds by inertia at a higher angular speed.

In the known pulley assemblies, the resultant of the radial pressures acting between the second end portion of the spring and the cylindrical wall causes an additional stress on the bushing which tends to wear out and have a limited working life.

DISCLOSURE OF INVENTION

It is the object of the present invention to make a pulley assembly free from the aforesaid drawback.

The object of the present invention is achieved by a pulley assembly as defined in claim 1.

BRIEF DESCRIPTION OF THE DRAWINGS

For a better understanding of the present invention, it will now be described a preferred embodiment only by way of non-limitative example, and with reference to the accompanying drawings, in which.

BEST MODE FOR CARRYING OUT THE INVENTION

Figure 1:
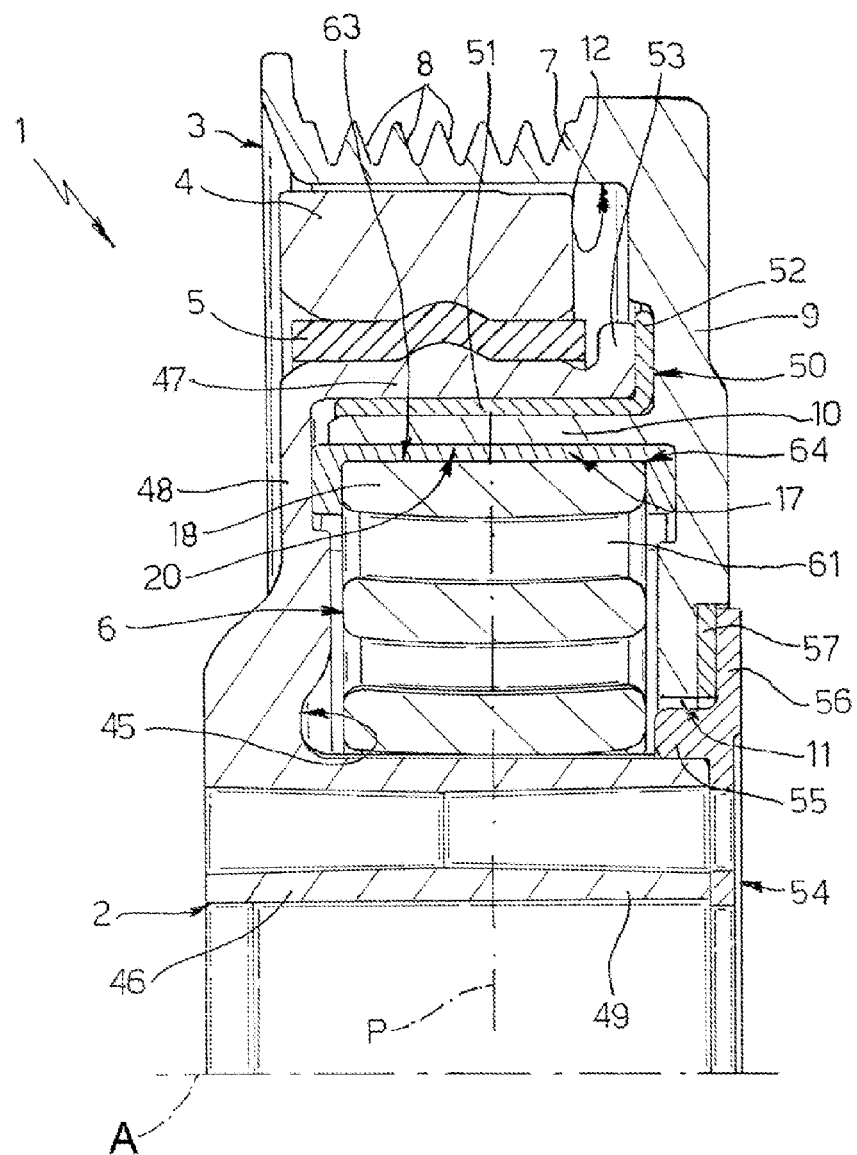
FIG. 1 is a radial section of a pulley assembly according to the present invention.

In FIG. 1, number 1 indicates as a whole a pulley assembly comprising a hub 2 adapted to be rigidly connected to a crankshaft of an internal combustion engine, a pulley 3 radially supported by hub 2, a seismic mass 4 connected to hub 2 by means of a band 5 of elastomeric material for defining a torsional vibration dynamic damper, and a spiral spring 6 for rotationally connecting hub 2 to pulley 3.

In particular, hub 2 defines an annular cavity 45 and integrally comprises a tubular element 46 having an axis A, a side wall 48 radially protruding from tubular element 46 and a cylindrical wall 47 radially external to tubular element 45.

Pulley 3 is preferably made of a single piece and comprises a crown 7 coaxial to axis A and defining a plurality of grooves 8 adapted to cooperate with a belt (not shown) of an accessory drive, a side wall 9 perpendicular to axis A and protruding from a side of crown 7 toward axis A, and a cylindrical wall 10 protruding from side wall 9 under crown 7 and having a diameter smaller than that of cylindrical wall 47 of hub 2.

Furthermore, side wall 9 defines a circular opening 11 having a diameter smaller than that of cylindrical wall 10.

Pulley 3 is fitted on hub 2 so that side wall 9 axially closes annular cavity 45 and that cylindrical wall 47 radially surrounds cylindrical wall 10.

In particular, is envisaged a bushing 50 inserted in annular cavity 45 between cylindrical walls 10 and 47 to radially support pulley 3 onto hub 2. Bushing 50 presents a transversal L-section and integrally comprises a cylindrical portion 51 radially inserted between cylindrical walls 10, 47 and a flange portion 52 inserted axially between side wall 9 and an abutting portion 53 radially protruding from a free end portion of cylindrical wall 47.

To axially secure pulley 3 and hub 2, an end portion 49 of tubular element 46 crosses circular opening 11 and pulley assembly 1 comprises an essentially flat retaining ring 54 bolted to end portion 49. When retaining ring 54 is fitted onto tubular element 46, pulley 3 is closed against flange portion 52 of bushing 50 and abutting portion 53 of hub 2 so as to recover the axial play and allow the relative rotation of hub 2.

In particular, retaining ring 54 integrally comprises an axial annular ridge 55 which defines a centring seat for connecting to tubular element 47 and a peripheral portion 56 facing side wall 9. Furthermore, a ring 57 of anti-friction material is axially interposed between peripheral portion 56 and side wall 9. Ring 57 is also accommodated in a specific seat defined by side wall 9 to prevent possible debris from depositing between ring 57 and the respective contact surfaces defined with side wall 9 and retaining ring 54

When pulley 3 is mounted on hub 2, cylindrical wall 47, crown 7 and a portion of side wall 9 delimit an annular cavity 12 for at least partially accommodating seismic mass 4 and band 5. Furthermore, annular cavity 12 surrounds annular cavity 45 which radially accommodates spring 6.

Figure 2:
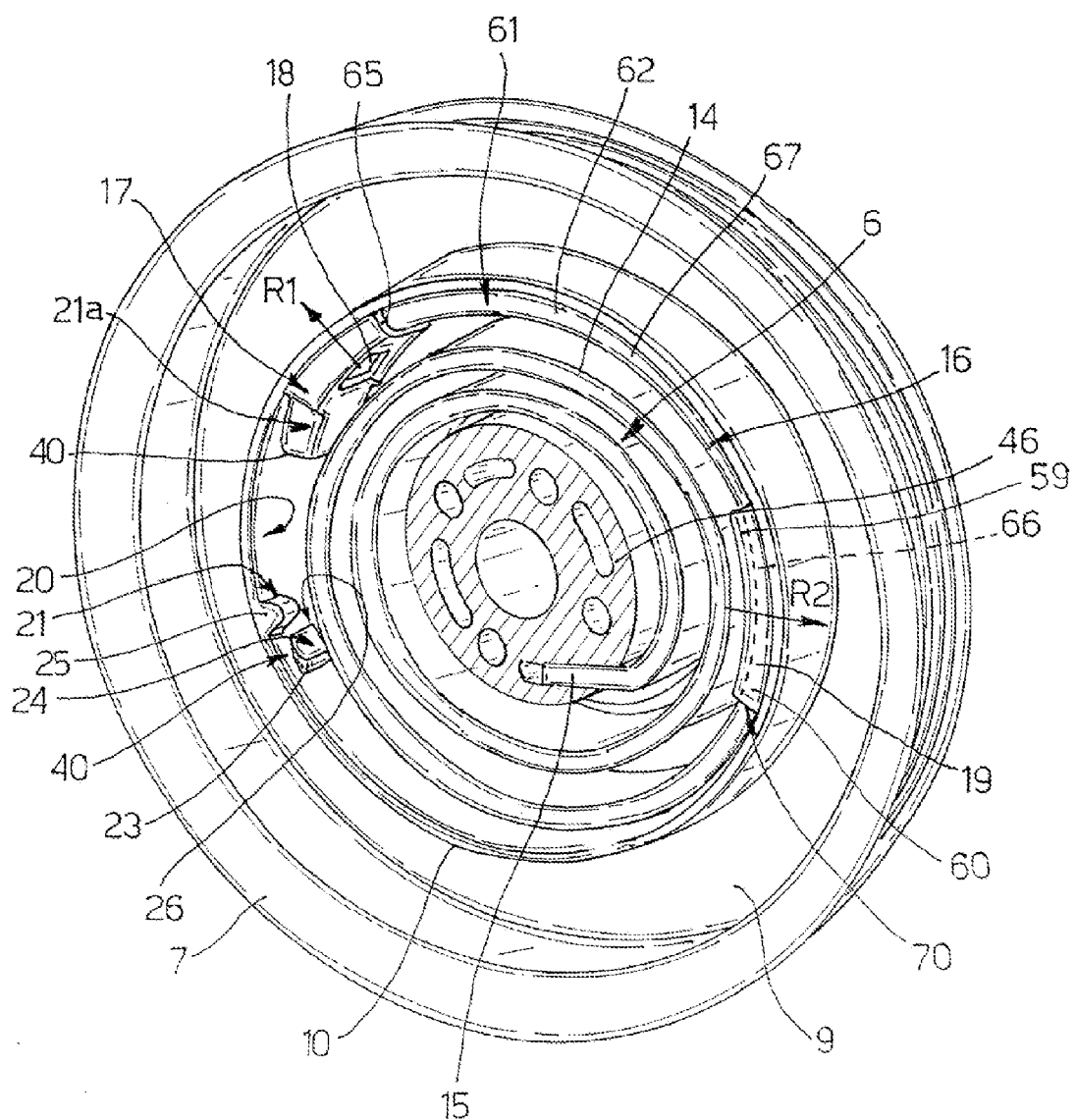
FIG. 2 is a perspective view of the pulley assembly in FIG. 1 with components removed for clarity.

Spring 6, generally made of harder material with respect to that used to make cylindrical wall 10, comprises a spiral portion 14 (FIG. 2), an end portion 15 radially within spiral portion 14 and rigidly connected to hub 2, and a radially external sliding portion 16 with respect to spiral portion 14 and cooperating with cylindrical wall 10.

Preferably, spring 6 is connected to hub 2 not exclusively by friction. For example, end portion 15 is radially folded towards axis A and inserted in a groove defined by hub 2. Other possible couplings are a coupling by means of a stiff fastening element, such as a pin, or a shape coupling.

Furthermore, sliding portion 16 presents a median plane P perpendicular to axis A and comprising a supporting portion 61 integral with spiral portion 14, a runner 17 rigidly connected to a free end portion 18 of supporting portion 61 and a runner 19 connected rigidly to a portion 66 of sliding portion 16 in a position distanced from runner 17 in tangential direction. The supporting portion 61 also presents an intermediate portion 67 radially distanced from cylindrical wall 10 and tangentially interposed between free end portion 18 and portion 66.

Spring 6 is mounted by radial interference within annular cavity 45 and runners 17, 19 are preloaded by the radial push of spiral portion 14 against a sliding surface 20 defined by cylindrical wall 10 and facing axis A.

Pulley assembly 1 also comprises a stop device 21 for locking the sliding of sliding portion 16 along cylindrical wall 10.

Stop device 21 comprises runner 17 and a pair of abutting elements 25 radially protruding from cylindrical wall 10 and axially distanced to delimit a hollow 26.

Preferably, the abutting elements 25 form a single piece with cylindrical wall 10.

According to a preferred embodiment, pulley assembly 1 also comprises a damping device 40 to dissipate at least part of the kinetic energy due to the relative speed between hub 2 and pulley 3. Damping device 40 comprises runner 17 and a wedge 23 arranged on tangentially opposite side of runner 17 with respect to abutting elements 25. Furthermore, wedge 23 defines an inclined surface 24 facing hollow 26 and arranged symmetrically to the median plane of hollow 26.

Figures from 3 to 5 show runner 17 which integrally comprises an anchoring portion 27 connected to free end portion 18 and a head portion 28 protruding from anchoring portion 27 along the tangential direction.

The width of anchoring portion 27 is wider than that of supporting portion 61 and comprises a covering wall 29 radially interposed between cylindrical wall 10 and free end portion 18 and a pair of side walls 30 protruding from covering wall 29 to cover respective sides 62 of free end portion 18.

Side walls 30 delimit a resting surface 32 defined by covering wall 29 and arranged in contact with a back 63 of supporting portion 61. Resting surface 32 presents, along the direction of axis A, convex generating lines at least in its central part. The curving radius of the generating lines of resting surface 32 is essentially equal to the anticlastic curving radius of the generating lines of back 63 and in particular to the curving radius of a central symmetric segment with respect to plane P of back 63.

Figure 4:
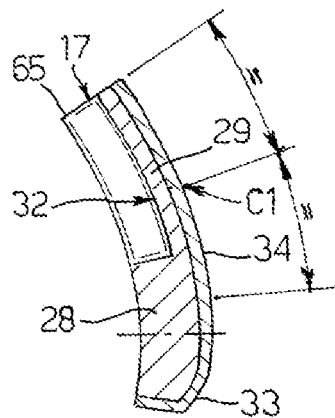
FIG. 4 is a section of FIG. 3 taken along line IV-IV in FIG. 3.
Figure 3:
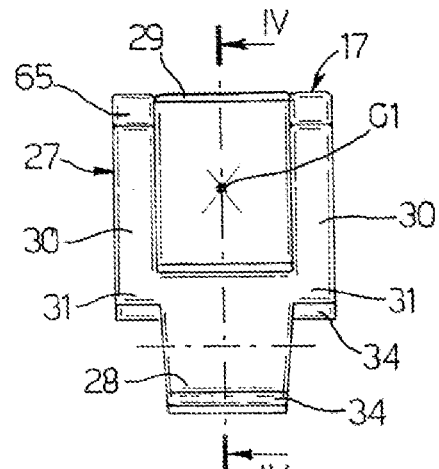
FIG. 3 is a bottom view of a component in the pulley assembly of FIG. 1.
Figure 5:
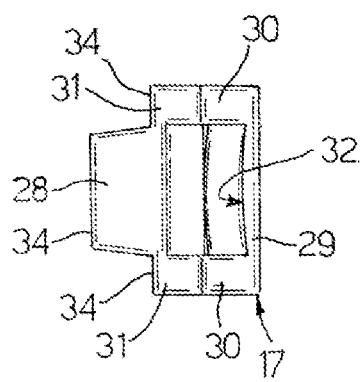
FIG. 5 is a rear view of FIG. 3.
Figure 6:
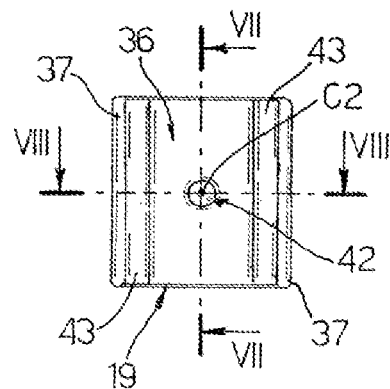
FIG. 6 is a bottom view of a second component in the pulley assembly according to the present invention.
Figure 8:
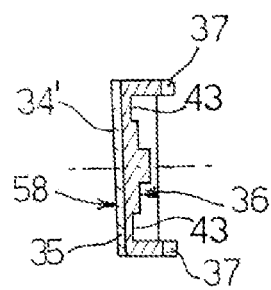
FIG. 8 is a section taken along line VIII-VIII in FIG. 7.

As shown in FIG. 4, covering wall 29 follows a circumference arch profile concentric to axis A and presents a thickness essentially constant on a plane perpendicular to axis A.

Anchoring portion 27 also comprises respective abutting walls 31 arranged perpendicularly both to side walls 30 and to covering wall 29.

Head portion 28 protrudes along the profile of covering wall 29 between abutting walls 31 and presents a width so as to engage with play in hollow 26.

Furthermore, head portion 28 defines a chamfer 33 facing sliding surface 20 and selectively cooperating with inclined surface 24.

Preferably, at least anchoring portion 27 is made by sintering from metallic powders and the covering wall 29 is coated by a layer 34 of polymeric material directly in contact with the sliding surface 20. Preferably, also abutting walls 31 and head portion 28 are coated with layer 34.

For example, the polymeric material comprises an epoxy resin preferably allied with a fluorinated plastomer.

Runner 19 (figures from 6 to 8) also comprises a covering wall 35 defining a convex surface 36 functionally similar to resting surface 32, a layer 34' of polymeric material having a constant thickness supported by the covering wall 35, and a pair of side walls 37 functionally similar to side walls 30.

Preferably, covering wall 35 presents a back surface 58 having a cylindrical profile coaxial to axis A and a variable thickness along the tangential direction to make the contact pressure distribution uniform.

In particular, thickness S1 of a proximal portion 59 of covering wall 35 facing runner 17 is higher than thickness S2 of a distal portion 60 of covering wall 35 arranged on the tangentially opposite side of runner 17 with respect to proximal portion 59. In particular, the thickness continuously increases from distal portion 60 towards proximal portion 59.

Figure 7:
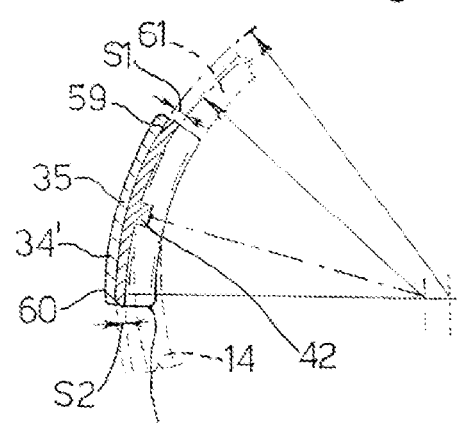
FIG. 7 is a section of FIG. 6 taken along line VII-VII in FIG. 6.

According to the embodiment shown in FIG. 7, the thickness variation of covering wall 35 is obtained because convex surface 36 presents in section along plane P a circumference arch profile having a radius smaller than that of back surface 58 and a centre specifically arranged for this purpose.

Furthermore, covering wall 35 comprises a protrusion 42 centrally protruding from the same side as lateral walls 37. In use, the protrusion couples with a hole, possibly blank, made on back 63 of supporting portion 61 to obtain a rigid connection for shape coupling in tangential direction.

Furthermore, covering wall 35 defines a pair of relieves or recesses 43 arranged to be parallel to side walls 37 and delimiting convex surface 36. Relieves 43, possibly also present on runner 17, allow to receive the generally irregular edge 64 of sides 62 of spring 6.

The operation of pulley assembly 1 is as follows.

When the crankshaft drags the accessory drive, hub 2 drags pulley 3 and transfers a positive torque which approaches runner 17 to abutting elements 25. Consequently, abutting walls 31 of runner 17 are against respective abutting elements 25 and sliding portion 16 is in a stop position.

In particular, it is important that runner 17 cannot exceed the abutting elements 25 at any positive torque running or design value. One way of obtaining such effect is to orient the contact surfaces between abutting walls 31 and abutting elements 25 so that the value of a possible force component parallel to the contact surfaces and directed towards hub 2 is negligible with respect to the friction force acting on the contact surfaces. For example, the contact surfaces may be essentially parallel to the radial direction.

When hub 2 drags pulley 3, spiral portion 14 of spring 6 tends to unwind and supporting portion 61 adheres completely to resting surface 32 by effect of the transmitted torque.

In such condition, the static torque transmitted between hub 2 and pulley 3 is proportional to the relative angular position between hub 2 and pulley 3.

In particular, covering wall 35 is subject to a distribution of radial pressures which is the sum of the two contributions.

The first contribution relates to the action of spiral portion 14 and is mainly concentrated at distal portion 60. The second contribution is due to the radial bending, of the supporting portion 61 by effect of the increasing thickness of covering wall 35. In particular, proximal portion 59 presents a thickness S1 increasing with respect to thickness S2 of portion 60 and therefore induces a bending of wall 61. The contribution of such bending tends to concentrate at the proximal portion 59 and the variation of thickness is calculated so that the sum of the two radial contributions leads to an essentially constant distribution along the tangential direction of the radial pressures when hub 2 drags pulley 3 and spiral portion 14 is under load.

During operation, when hub 2 drags pulley 3, the spiral portion 14 filters the torsional vibrations transmitted to hub 2 by the crankshaft while runner 17 always remains against the abutting elements 25 thanks to the radial preload of sliding portion 16 against cylindrical wall 10.

In the case of sudden deceleration, the inertia of the accessory transmission transfers a negative torque to pulley assembly 1 which distances runner 17 from abutting elements 25.

In particular, the value of such torque is higher than threshold value of the torque only transmissible by friction between sliding portion 16 and cylindrical wall 10. Such threshold value depends on the friction coefficient between runners 17, 19 and sliding surface and on the radial preload of sliding portion 16 against cylindrical wall 10.

Under the bias of a negative torque higher that the threshold, runner 17 is separated from abutting elements 25 and in this way produces a joint in advance effect because sliding portion 16 slides on cylindrical wall 10 and is driven in axial direction by respective side walls 30, 37 which cooperate with side walls 9, 48.

When runner 19 slides on sliding surface 20, the rotation of pulley 3 is independent from the angular position of hub 2 because the friction force exerted by sliding portion 16 while sliding essentially is independent from the angular relative position between hub 2 and pulley 3.

Furthermore, in negative torque condition, spiral portion 14 tends to wind and the distribution of radial pressure along covering wall 35 is not constant in tangential direction but is concentrated at proximal portion 59. However, the absolute value of the contact radial pressure when spiral portion 14 is wound is lower than that previously described in which spiral portion 14 is unwound therefore stressing less severely the proximal portion 59.

When the motor accelerates again, hub 2 tends to be in advance of pulley 3 and sliding portion 16 slides on sliding surface 20 towards abutting elements 25 once the average value of the torque transmitted by the crankshaft exceeds the threshold torque. At the same time, spiral portion 14 is unwound and supporting portion 61 fully adheres to convex surface 36.

In particular, before runner 17 abuts against abutting elements 25, chamfer 33 slides on the inclined surface 24 and induces an increase of the radial force exerted by runner 17 on inclined surface 24. Consequently, friction force increases and in this way damping device 40 tends to decrease the relative speed between hub 2 and pulley 3 and to dissipate by friction the kinetic energy to attenuate the impact against abutting elements 25.

Furthermore, runners 17, 19 are distanced in tangential direction so that the total resultant of the radial forces exerted by spring 6 on pulley 3 by means of runners 17, 19 is reduced. In particular, the total resultant is the sum of the partial resultants R1, R2 acting respectively at runner 17 and runner 19 and the total resultant is minimal when the partial resultants are distanced by 180°. Such effect is reached because pressure is concentrated on runners 17, 19 with respect to intermediate portion 67, which is distanced radially from the sliding surface 20 along the arch which reciprocally separates runners 17, 19.

The angular distance of the partial resultants R1, R2 may vary respect to 180° value and it will suffice to be comprised from 150° to 210° to obtain advantageous reduced values of the total resultant of radial forces. A method for having an indication about the angular distance between R1 and R2 is to consider homologous points C1, C2 of respective runners 17, 19. For example, homologous points C1 and C2 may be the centres of respective theoretical contact areas defined on runners 17, 19 or the respective ends 65, 70 of runners 17, 19. In the present embodiment, the theoretical contact areas are defined by the entire curved surface having a rectangular plane development of layer 34' of runner 19 and, on layer 34 of runner 17, by the curved surface having a rectangular plane development delimited between end 65 and abutting portions 31.

The advantages that the present pulley assembly allow to obtain are the following.

The fact that the contact zones, i.e. runners 17, 19, in which the contact pressure is concentrated are distanced in tangential direction allows to obtain the effect that the vectorial sum of the respective resultants R1, R2 is lower than the sum of the modules of R1 and R2 by a factor which varies by the square root of the cosine of the angle comprised between resultants R1, R2 according to Carnot's theorem. The radial stress on bushing 50 is therefore decreased.

Furthermore, the fact that runners 17, 19 are distanced in tangential direction allows to determine a constraint condition for spiral portion 14 similar to an ideal joint and therefore allows to reduce internal tensions in spiral portion 14 itself.

The presence of runners 17, 19 allow to control the wear of cylindrical wall 10, which is generally made of a softer material than that used to make spring 6.

The fact that the curving radiuses in a plane containing axis A of back 63 and those of the resting 31 and convex 36 walls are equal allow a uniform and essentially symmetric distribution with respect to the median plane P of the radial pressure exerted by supporting portion 61. In this way, torque acting on a plane parallel to axis A are avoided.

A better distribution of the contact pressures and a consequent lower wear of runners 17, 19 is also obtained by means of the variable thickness of covering wall 35 and by means of relieves or recesses 43. In particular, relieves 43 compensate the high irregularities of edges 64.

The manufacturing of anchoring portion 27 and abutting walls 31 by sintering allows to reach high mechanical shock-resistance features.

Side walls 30, 37 prevent supporting portion 61 from coming directly into contact with side wall 9 and damaging it.

The use of a damping device acting when a stop position is reached allows to decrease the noise and stress on runners 17, 19.

It is finally apparent that changes and variations can be made to pulley assembly 1 here described and illustrated without departing from the scope of protection of the present invention, as defined by the accompanying claims.

Sliding portion 16 may be differently configured. For example, intermediate portion 67 may also be coated with a contact layer in use with cylindrical wall 10 and possibly comprising runners 17, 19 for forming a single covering layer. In this case, free end portion 18 and portion 66 may present a higher curving radius with respect to the radius of sliding surface 20 of cylindrical wall 10 when spring 6 is in a relieved condition before assembly. In this way, when spring 6 is fitted, the distribution of pressure is concentrated at the free end portion 18 and at the portion 66. In particular, at the free end portion 18 and at the portion 66 the pression presents respective peak values equal to L1 and L2 higher than peak value L3 that is at intermediate portion 67, even if the intermediate portion 67 is in contact with the sliding surface 20.

Advantageously, such contact pressure distribution equally allows to obtain a radial force resultant having a low value.

Runners 17, 19, may be connected to supporting portion 61 by means of a layer of adhesive material and may not be provided with protrusions which define a shape coupling. For example, they may simply consist of a glued layer.

Alternatively, at least one of runners 17, 19, and preferably runner 19, may be co-moulded directly onto supporting portion 61.

In an embodiment in which runner 17 is co-moulded, the geometric features for stop device 21 and/or for damping device 40, for example chamfer 33, are made directly on free end portion 18 of supporting portion 61.

Preferably, when runner 17, 19 is co-moulded, it is made of fibre-reinforced composite polymeric matrix material, for example carbon fibre, and comprising an anti-friction material, for example fluorinated polymer.

According to a further embodiment, at least one of the runners 17, 19 presents a pair of protrusions protruding from respective side walls. The protuberances are accommodated in corresponding hollows made on sides 62 of the supporting portion 61 to define a rigid connection for shape coupling in tangential direction.

Furthermore, a stop device different from that described may be envisaged. In particular, a stop device comprising a groove delimited in tangential direction by respective abutting surfaces and made in the side wall 9 of pulley 3 within the annular cavity 45 may be envisaged. Such groove accommodates one of the side walls 30, 37 of runner 17, 19 which is locked when it cooperates with one of the abutting surfaces.

Also damping device may differ from that described. In particular, an appropriately shaped ridge to define both the stop position and the inclined surface needed to dampen the relative kinetic energy between hub 2 and pulley 3 may be envisaged.

In particular, the shaped ridge defines an abutting surface arranged radially and a curved surface to join sliding surface 20 to the abutting surface.

When pulley 3 comprises the previously described shaped ridge, sliding portion 16 may comprise a co-moulded runner 17. In this case, free end portion 18 defines a chamfer similar to chamfer 33 and cooperating on the curved surface to obtain the damping effect. Free end portion 18 also defines a head portion appropriately joined to chamfer and cooperating against abutting surface of the ridge to define the stop position of sliding portion 16. The head portion either may be covered by a layer or there may be direct contact between the head portion metal and the shaped ridge metal.

In a simplified construction, pulley assembly 1 may not be provided with stop device 21, and in the stop position sliding portion 16 and pulley 3 may be coupled only by friction between sliding portion 16 and cylindrical wall 10. In this case, the contact layer with sliding surface 20 may be made of friction material, such as for example, lining.

Figure 9:
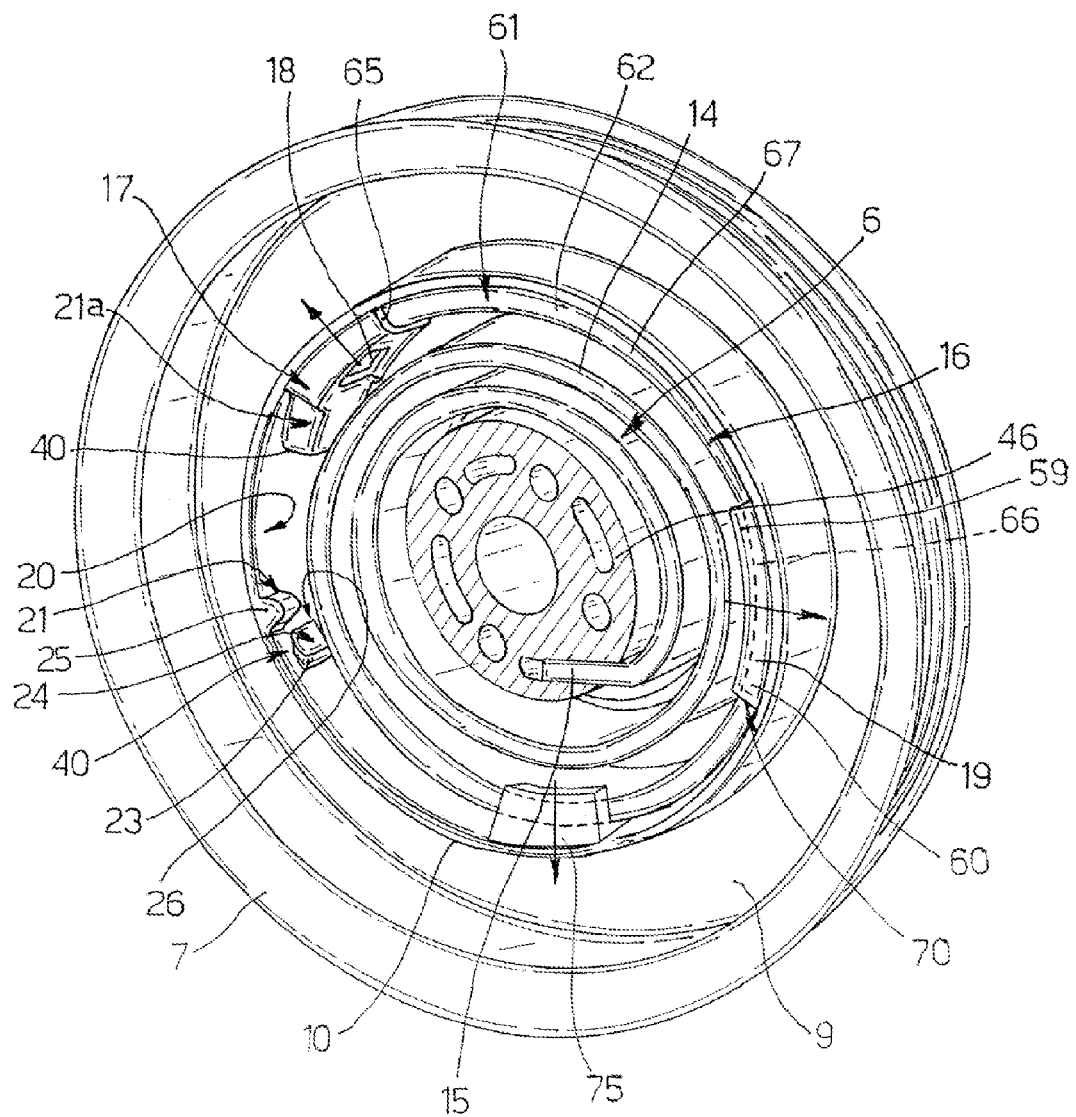
FIG. 9 is a perspective view of a pulley assembly of a second embodiment of the present invention.

Sliding portion 16 may also comprise, as shown in FIG. 9, a third runner 75 angularly and equally distanced from runners 17, 19 and preferably arranged so that the comprised angles are approximately 120°. The presence of a third runner allows higher stability of the sliding portion 16 with respect to movements in direction parallel to axis A. Furthermore, if the angles are 120°, the effect according to which the radial forces are essentially null is preserved.

A further simplified embodiment may be envisaged in which sliding portion 16 is not provided with runners 17, 19 and free end portion 18 and portion 66 are directly in contact with cylindrical wall 10. Possibly, also intermediate portion 67 may be in contact with the cylindrical wall 10 but the corresponding peak value L3 of the contact pressure must be lower than the peak values L1, L2 of respective free end portion 18 and portion 66.

The invention claimed is:

1. A pulley assembly for flexible motor vehicle transmission, comprising a supporting member rotatable about an axis (A), a pulley adapted to cooperate with a belt and connected to said supporting member to be rotatable about said axis (A) with respect to said supporting member, a spiral spring interposed between said supporting member and said pulley and comprising a sliding portion elastically loaded in radial direction against a sliding wall carried by one of said supporting member or pulley for coupling said pulley to said supporting member by a circumferential force transmission, wherein said sliding portion defines a first contact zone and at least one second contact zone in which the contact pressure exchanged between said sliding portion and said sliding wall is concentrated, said first and at least one second contact zones being angularly spaced apart in a circumferential direction;

wherein said spiral spring comprises a supporting element and in that said sliding portion comprises at least one runner carried by said supporting element and defining at least one of said first and second contact zones; and wherein said sliding portion comprises said supporting element and in that it comprises a stop member against which said sliding portion is locked in a stop position with respect to said sliding wall.

2. The pulley assembly according to claim 1, wherein said sliding portion comprises an intermediate portion radially spaced from said sliding wall and tangentially interposed between said first and second contact zones.

3. The pulley assembly according to claim 1, wherein said first and second contact zones are spaced by an angle in the range from 150° to 210°.

4. The pulley assembly according to claim 1, wherein said first and second contact zones are spaced so that the contact pressure resultant between said sliding portion and said sliding wall is essentially null.

5. The pulley assembly according to claim 1, wherein said sliding portion defines a third contact portion tangentially interposed between said first and second contact zones.

6. The pulley assembly according to claim 1, wherein said at least one runner comprises a covering wall radially interposed between said supporting element and said sliding wall.

7. The pulley assembly according to claim 1, wherein said supporting element presents a back having generating lines with a concave central segment, and in that said covering wall defines a convex surface shaped to couple with said central concave segment.

8. The pulley assembly according to claim 1, wherein said at least one runner defines a pair of relieves delimiting in direction parallel to said axis (A) said convex surface and accommodating side edges of said supporting element.

9. The pulley assembly according to claim 1, wherein said at least one runner is connected to said supporting element by a shape coupling acting in tangential direction.

10. The pulley assembly according to claim 1, wherein said at least one runner comprises a metallic structure.

11. The pulley assembly according to claim 1, wherein said at least one runner is co-moulded onto said supporting element.

12. The pulley assembly according to claim 1, wherein said at least one runner is connected by an adhesive layer to said supporting element.

13. The pulley assembly according to claim 1, wherein said at least one runner comprises a pair of walls covering respective sides of said supporting element.

14. The pulley assembly according to claim 1, wherein said at least one runner comprises a layer arranged in contact with said sliding wall and made of either a polymeric material, or a composite fibre-reinforced polymeric matrix material or a friction material.

15. The pulley assembly according to claim 1, wherein said spiral spring comprises a spiral portion connected to said sliding portion and in that said covering wall of said at least one runner presents a radial thickness increasing from said spiral portion towards said supporting element.

16. The pulley assembly according to claim 1, wherein said stop member comprises a damping device to slow movement of said pulley with respect to said hub before impact with said stop member.

17. The pulley assembly according to claim 16, wherein said damping device comprises an inclined element carried by said sliding wall and cooperating with said sliding portion to increase the radial load exerted by said sliding portion before said hub and said pulley reach said stop position.

18. The pulley assembly according to claim 1, wherein said stop member comprises a first and a second projection radially protruding from said sliding wall and laterally defining a passage and in that the sliding portion comprises a head portion entering said passage to cooperate with said inclined element and a pair of abutting portions arranged on opposite sides of said head portion with respect to a medium plane (P).

19. The pulley assembly according to claim 1, wherein said sliding portion comprises a second runner tangentially distanced from said at least one runner.

20. The pulley assembly according to claim 1, wherein it comprises a hub adapted to be fastened to a rotating member and a seismic mass connected to said hub to define a dynamic torsional vibration damper.

21. The pulley assembly according to claim 20, wherein said supporting member consists of said hub.

22. The pulley assembly according to claim 20, wherein said supporting member consists of said seismic mass.

23. The pulley assembly according to claim 1, wherein said spiral spring is rotationally joined to said supporting member not exclusively in a frictional manner.

* * * * *